United States Patent
Brok

(10) Patent No.: US 10,773,693 B2
(45) Date of Patent: Sep. 15, 2020

(54) METHOD AND DEVICE FOR ADJUSTING A ZERO POSITION OF A BRAKE PEDAL

(71) Applicant: AUDI AG, Ingolstadt (DE)

(72) Inventor: Tobias Brok, Kösching (DE)

(73) Assignee: AUDI AG, Ingolstadt (DE)

( * ) Notice: Subject to any disclaimer, the term of this patent is extended or adjusted under 35 U.S.C. 154(b) by 59 days.

(21) Appl. No.: 15/696,689

(22) Filed: Sep. 6, 2017

(65) Prior Publication Data

US 2018/0072282 A1 Mar. 15, 2018

(30) Foreign Application Priority Data

Sep. 13, 2016 (DE) .................. 10 2016 217 439

(51) Int. Cl.
*B60T 7/06* (2006.01)
*B60T 13/16* (2006.01)
*B60T 13/48* (2006.01)

(52) U.S. Cl.
CPC .............. *B60T 7/06* (2013.01); *B60T 13/161* (2013.01); *B60T 13/48* (2013.01)

(58) Field of Classification Search
CPC ........... B60T 7/06; B60T 13/161; B60T 13/48
See application file for complete search history.

(56) References Cited

U.S. PATENT DOCUMENTS

| 2013/0169033 A1* | 7/2013 | Svensson | B60T 13/161 303/10 |
| 2014/0368027 A1* | 12/2014 | Bohm | B60T 8/4081 303/14 |
| 2015/0375726 A1* | 12/2015 | Roll | B60T 8/4081 303/3 |

FOREIGN PATENT DOCUMENTS

| DE | 10334191 A1 | 2/2005 |
| DE | 10343137 A1 | 4/2005 |
| DE | 102013224313 A1 | 9/2014 |

OTHER PUBLICATIONS

German Search Report dated Jul. 25, 2017 of corresponding German application No. 102016217439.8; 10 pgs.

* cited by examiner

*Primary Examiner* — Bradley T King
*Assistant Examiner* — James K Hsiao
(74) *Attorney, Agent, or Firm* — Maier & Maier, PLLC

(57) ABSTRACT

A method for adjusting a zero position of a brake pedal of a brake system of a motor vehicle. A separating valve arranged at least between a main brake cylinder and the respective wheel brakes of the brake system is opened in order to reduce a volume of the brake fluid in a secondary circuit of the brake system. At least one separating valve is then closed again after the volume of the brake fluid of the secondary circuit has been reduced by the predetermined volume amount, and the brake pedal is moved to a new zero position.

14 Claims, 1 Drawing Sheet

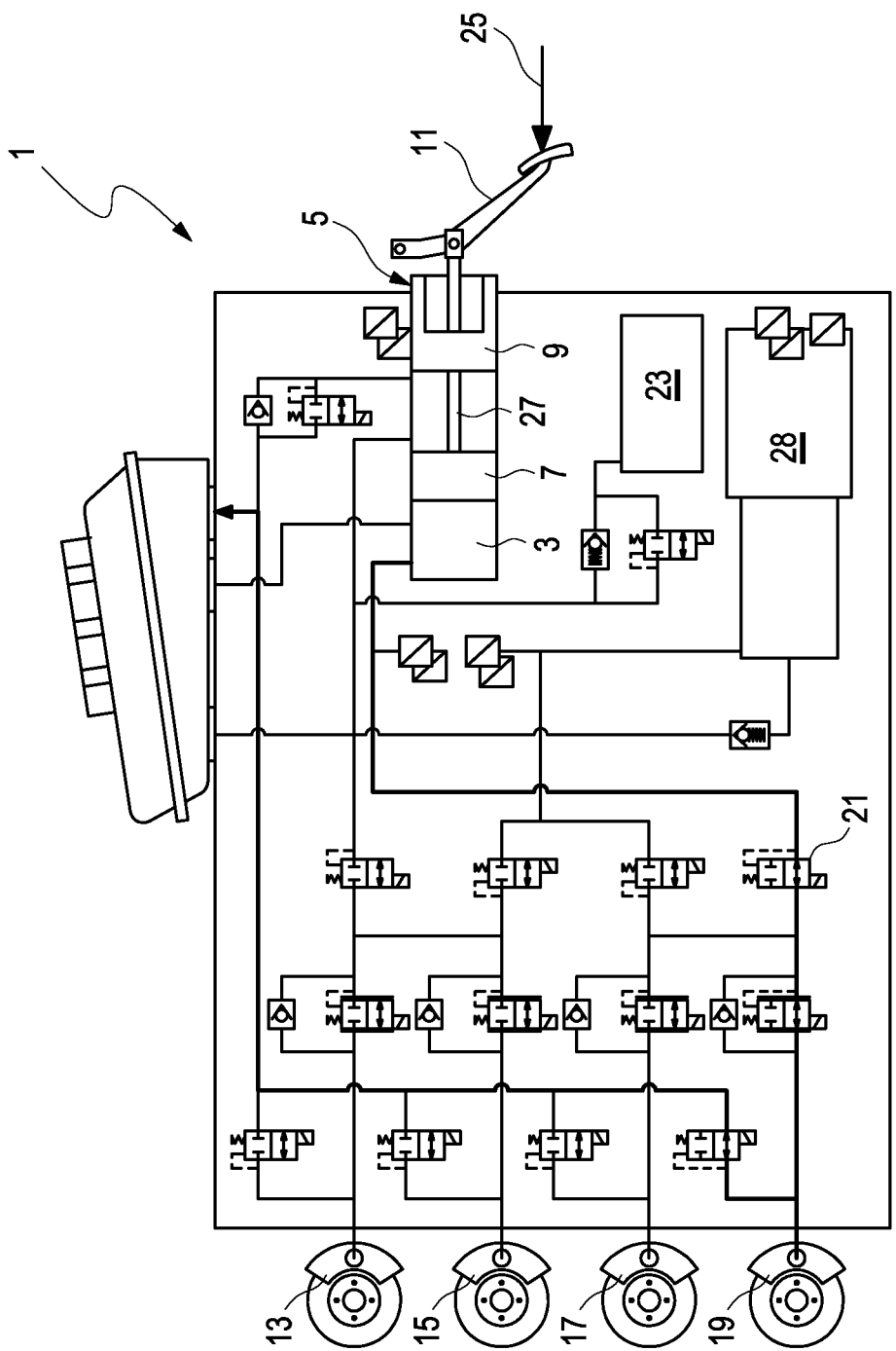

METHOD AND DEVICE FOR ADJUSTING A ZERO POSITION OF A BRAKE PEDAL

FIELD

The present invention relates to a method for adjusting a zero position of a brake pedal of a brake system of a motor vehicle and a brake system.

BACKGROUND

Hydraulic brake system in motor vehicles are usually operated with vacuum brake boosters. A vacuum pressure required for this purpose is generally provided by internal combustion engines or with vacuum pumps driven on the side of the engine.

In vehicles provided with electromotive or hybrid drives, vacuum is not supplied constantly via a internal combustion engine. In order to make it possible to provide a reliable deceleration of a motor vehicle, vacuum-independent braking systems are used.

For example, a vacuum-dependent brake system can be designed in such a way that braking is no longer initiated with an activation of a brake pedal by the foot of a driver. For this purpose, during the normal operation, which is to say in an operation without a system error, the braking pedal is hydraulically decoupled from the respective brakes. In this case, a pedal feel or a feedback signal is generated by actuating the brake pedal for the driver by means of a pedal simulator, so that the driver is enabled to perform a mechanical-hydraulic operation in order to actuate the brakes only in the case of an error. Such a hydraulic decoupling of the driver from the braking operation offers new technical possibilities, such as possibilities for an adjustment of a zero position of the braking pedal.

Adjusting a pedal position, or of a zero position of a brake pedal can be useful for a number of different reasons. In most cases, the zero position of a brake pedal is adjusted for ergonomic reasons, for example in order to improve the ease of operation and the accessibility of the brake pedal, in particular with motor vehicles in which a high deceleration occurs when the accelerator pedal is released, such as for example with thrust deceleration or with thrust simulation. If the driver steps on the brake pedal during a thrust deceleration, this will generally result in excessive braking because the zero position of the braking pedal and the pedal force at this point do not correspond to the pedal forces and to the ways for using the pedal that are usually employed with this deceleration for moving the pedal to a position that corresponds to deceleration and that would be expected if the braking were carried out only by means of the brake pedal, which is to say without thrust deceleration or thrust simulation.

Mechanical devices that are currently used for adjusting pedals are very complex, delicate and expensive.

In the German document DE 103 34 191 A1 is disclosed an adjustable pedal arrangement that is provided with a translational adjustment capability and with a rotary adjustment capability.

The German document 10 2013 224 313 A1 discloses a vacuum-independent braking system for a motor vehicle.

SUMMARY OF THE DISCLOSURE

Against this background, the object of the present invention is to provide a mechanically robust and weight-optimized mechanism for adjusting a zero position of a braking pedal.

In order to achieve this objective, a method for adjusting a zero position of a braking system of a motor vehicle is provided, wherein at least one separating valve arranged between a main brake cylinder and respective wheel brakes of the braking system is opened in order to reduce a volume of the braking fluid in a secondary circuit of the braking system, and wherein after that, the volume of the brake fluid of the secondary circuit that was reduced by a predetermined volume amount is closed again with the at least one separating valve, so that the brake pedal is moved into a new zero position.

Embodiments of the invention will become evident from the description and from the dependent claims.

The method mentioned above serves in particular to adjust a zero position of a brake pedal of a brake system of a motor vehicle. For this purpose, according to this invention it is provided that a volume of a brake fluid is reduced in a secondary circuit, i.e. in a floating circuit of a braking system, so that a pressure point for building brake pressure is shifted to the respective brakes of the motor vehicle and the braking pedal is correspondingly moved, or can be moved, to a new zero position.

In order to reduce the volume of a brake fluid that is located in a secondary circuit of a brake system, according to the invention it is provided that at least one separating valve is opened in the secondary circuit in order to lower or suction off the brake fluid so that then it is closed again.

Under the term zero position is in the context of the present invention to be understood a position of a braking pedal in which no braking effect is generated by a braking system assigned to the braking pedal and into which the brake pedal is moved back after braking.

The method described here is based on the principle that a resting position, i.e. an inherent zero position, and a position of the secondary piston of a tandem brake cylinder, is changed by the reduction of the brake volume of the brake fluid in the secondary circuit. As a result, an intrinsic zero position of a primary piston is thus also changed and finally, so is the zero position of the brake pedal which is connected to the primary piston. For this purpose, it can be provided that the primary piston, the secondary piston and the brake pedal are mutually connected to each other.

In the context of the present invention, a tandem cylinder is to be understood as a main brake cylinder for generating braking pressure in a braking system with a primary piston for supplying a brake pressure to a primary circuit of the brake system and to a secondary piston for supplying braking pressure to a secondary circuit of the braking system.

The method described here can be carried out with any braking system that comprises a tandem brake cylinder and a separating valve. In this case, the separating valve can be installed at any position of a secondary circuit of a braking system between the tandem brake cylinder and a respective brake.

According to a possible embodiment of the present invention, it is provided that the fluid removed from the secondary circuit is collected in a compensation tank and then introduced again into the secondary circuit at a later point in time.

In order to collect the brake fluid that has been displaced or suctioned off from the secondary circuit, for example a collecting tank can be provided, from which the fluid that was previously displaced, for example for an adjustment of a zero position of a brake pedal, for instance via the at least one separating valve provided according to this invention, can then be again suctioned off or displaced back into the secondary circuit.

According to another possible embodiment of the described method, a vacuum-independent brake system is provided as a brake system.

The method described is suitable in particular for adjusting a zero position of a brake pedal of a vacuum-independent brake system, because with a vacuum independent brake system, the brake pedal is during normal operation hydraulically decoupled from a brake circuit and it is only used to generate a haptic feedback for a driver by means of a pedal simulator.

In another possible embodiment of the described method, the spring force of at least one spring arranged in a primary circuit of the brake system for moving at least one primary piston of the brake system is selected in such a way that the at least one primary piston is moved at the most up to a point at which the at least one primary piston contacts the brake pedal in the new zero position.

In order to prevent a brake pedal from moving back after a reduction of a volume of the brake fluid in a secondary circuit of a brake system in a zero position adjacent to the position before the reduction, the spring must be selected in such a way that it has a spring force which will move the primary piston for example only up to a position before the new zero position, or at the most up to the new zero position. For this purpose, a spring force of the spring can be dynamically adjusted for example by means of a screw, or with a counterforce to the spring force. It goes without saying that the spring force of the spring can be selected in such a way that it is only sufficient to move the primary piston at the most back to a position in before the new zero position, so that the brake pedal is not displace from its new zero position or moved forward by the primary piston.

In a further possible embodiment of the method described, it is provided that at least one primary piston is tied to the at least one secondary piston.

In order to prevent the respective primary piston from moving into an original position, which is to say a rest position of the volume of the brake fluid before the reduction in a secondary circuit of the brakes system, the primary piston can be connected to the secondary piston by means of a restraint, such as a restraint known from prior art. For this purpose, for example a flexible connection can be provided between the primary and the secondary piston, which can be stretched at the most up to the length of a position to which the primary piston can be moved and in which the brake pedal remains in the new zero position.

In another possible embodiment of the method described, it is provided that the predetermined volume amount of the brake fluid of the secondary circuit is pressed out of the secondary circuit by pressing the brake pedal out of the secondary circuit.

The use of a pressure provided by a brake pedal of a braking system is suitable in order to reduce the brake fluid in a secondary circuit of a brake system as simply as possible and in a robust manner without technical errors. This means that in order to reduce the brake fluid in the secondary circuit and accordingly, to move the brake pedal into a new zero position, the brake pedal is compressed while the separating valve according to the invention is opened. The result of a pressure that builds up with a movement of the brake pedal with the movement of the brake pedal is thus that the brake fluid is pressed out through at least one separating valve from at least one separating valve. After the volume has been reduced in the secondary circuit to a predetermined value, the at least one separating valve is closed again and the secondary circuit can be used for activating a brake with a reduced volume of the brake fluid. Such a method for adjusting a zero position of a brake pedal is quiet, technically robust and maintenance free.

In another possible embodiment of the method described, it is provided that the predetermined volume amount of the brake fluid of the secondary circuit is displaced with an active pressure buildup of a pressure generator of the brake out of the secondary circuit.

It goes without saying that the reduction of the volume of the brake fluid in a secondary circuit of a respective brake system according to the invention can also occur independently of a movement of a brake pedal of the system, or by means of an automatic pressure generator, such as for example a pump, or a secondary piston of the moving mechanism of the brake system.

In another possible embodiment of the method described, it is provided that the predetermined volume amount of the brake fluid of the secondary circuit is suctioned off out of the secondary circuit.

In order to achieve the reduction of the volume of the brake fluid in a secondary circuit of a brake system provided according to the invention, the brake fluid can be suctioned off also for example by means of a reversed operation of a pressure generator unit.

In another possible embodiment of the method described, it is provided that at least one separating valve is opened or closed as a function of the current state of the motor vehicle.

In order to adjust a zero position of a brake pedal according to a state of the motor vehicle and thus for example to report a defect of a brake system to a user of the motor vehicle, it can be provided that at least one separating valve provided according to the invention is opened depending on the current state or on a changed state of the motor vehicle. For this purpose, it can be for instance provided that at least one separating valve is provided with a communication interface by means of which the opening and closing behavior of the at least one separating valve is adjusted.

The present invention further also relates to a brake system with a brake pedal that is adjustable in its zero position and at least one separating valve arranged between a main brake cylinder and the respective brakes of the wheels of the braking system, wherein at least one separating valve is configured to become open as a function of a control command to reduce the volume of the brake fluid in a secondary circuit of the brake system, and wherein the at least one separating valve is further configured to become closed again after the volume of the brake fluid of the secondary circuit has been reduced by a predetermined volume amount, which was selected depending on new a zero position of the brake pedal.

The described brake system is used in particular to carry out the described method.

In a possible embodiment of the described brake system it is provided that at least one separating valve is provided with an interface for performing control by means of a control device, wherein the control device is configured to detect the control command for opening and closing the at least one separating valve as a function of a predetermined zero position of the brake pedal and to transmit it via an interface to the at least one separating valve.

In order to adjust a zero position of a brake pedal of a respective brake system dynamically as a function of a motor vehicle parameter, or of a state of the motor vehicle, it is provided that the control command to open and close the at least one separating valve is detected as a function of a predetermined zero position of the brake pedal and transmitted via the interface to at least one separating valve.

In order to adjust the zero position of a respective control system dynamically as a function of a motor vehicle parameter or of a state of the motor vehicle, it is provided that at least one separating value provided according to the invention is dynamically opened and closed. In order to control the opening and closing behavior of the at least one separating valve, an interface is suitably provided at the at least one separating valve. so that its corresponding control commands, which are provided for example by a control device of the motor vehicle, are transmitted or can be transmitted to the at least one separating valve.

In another possible embodiment of the present method it is provided that the brake system comprises at least one electric engine by means of which a recuperation-based brake operation is carried out, and wherein the predetermined zero position of the brake pedal is detected as a function of a deceleration output of the electric engine.

Further advantages and embodiment of the invention will become apparent from the description and from the accompanying FIGURES.

It goes without saying that the features mentioned above and those that are still to be explained below can be used not only in the respective combinations indicated here, but also in other combinations, or in a single setting, without deviating from the scope of the present invention.

BRIEF DESCRIPTION OF THE DRAWINGS

The invention will now be described in detail based on embodiments that are schematically illustrated in the FIGURE and it will be described with reference to the schematic illustration.

FIG. 1 shows a schematic representation of a possible embodiment of the brake system according to the invention.

DETAILED DESCRIPTION OF THE DRAWINGS

FIG. 1 shows an illustration of a brake system 1 comprising a secondary circuit 3, i.e. a floating circuit, and a tandem brake cylinder 5, in which are arranged a secondary piston 7 and a primary piston 9. Furthermore, the brake system 1 comprises a brake pedal 11 and hydraulic brakes 13, 15, 17, 19, as well as a separating valve 21 and a pedal simulator 23 for simulating a brake pressure during a brake operation.

In order to change a zero position of the brake pedal 11 and the inform the driver about this outage, the separating valve 21 is opened. After the separating valve 21 has been opened, a pressure is built up in the secondary circuit 3 as indicated by the arrow 25, which causes the brake fluid to become displaced from the secondary circuit 3 via the separating valve 21. The separating valve 21 remains in this case opened for as long until a predetermined volume of the brake fluid has been displaced from the secondary circuit 3. After that, the separating valve is closed again.

Alternatively, it is also conceivable that the predetermined volume of the brake fluid is suctioned off for example with a reversed operation with a pressure generator unit 28 from the secondary circuit 3.

It is provided that the separating valve 21 is opened for example to adjust the brake pedal 11. Furthermore, the primary piston 9 and the secondary piston 7 are moved into a rear position by means of a spring system of the secondary circuit 3, so that a maximum brake fluid volume is available to the driver for a deceleration.

The predetermined volume of brake fluid which is displaced from the secondary circuit or suctioned off from the secondary circuit is selected in such a way that the brake pedal is moved to a new zero position. This means that due to the reduced volume of the brake fluid, a rest position of the secondary piston 7 is shifted by a certain length. Since the primary piston 9 is connected by means of a restraint 27 to the secondary piston 7, a rest position of the primary piston 9 is also shifted and therefore, the zero position of the brake pedal is a function of the length of the shift of the displacement of the rest position of the secondary piston 7.

The invention claimed is:

1. A method for adjusting a zero position of a brake pedal of a brake system of a motor vehicle, comprising:
a lone separating valve, arranged in a secondary circuit of the brake system between a main brake cylinder and respective wheel brakes of the secondary circuit, is opened in order to reduce a volume of a brake fluid in the secondary circuit of the brake system, and wherein the lone separating valve is then closed again after the volume of the brake fluid of the secondary circuit has been reduced by a predetermined amount, whereby the brake pedal is moved to a new zero position, and wherein the brake system comprises a tandem brake cylinder housing a primary piston in fluid communication with a primary circuit and a secondary piston in fluid communication with the secondary circuit, and wherein only the brake fluid level of the secondary circuit is reduced by the opening of the lone separating valve.

2. The method according to claim 1, wherein a vacuum-independent brake system is used as the brake system.

3. The method according to claim 1, wherein the spring force of springs arranged at least in a primary circuit of the brake system, which is used to move at least one primary piston of the brake system, is selected in such a way that at least one primary piston is moved at the most up to a new point at which the at least one primary piston contacts the brake pedal in the new zero position.

4. The method according to claim 3, wherein the at least one primary piston is restrained by at least one secondary piston.

5. The method according to claim 1, wherein the predetermined volume amount of the secondary circuit is pressed, by actuation of a brake pedal, out of the secondary circuit through the lone separating valve.

6. The method according to claim 1, wherein the predetermined volume amount of the brake fluid of the secondary circuit is pressed by an active buildup of the pressure of a pressure generator of the brake system out of the secondary circuit.

7. The method according to claim 1, wherein the predetermined volume amount of the brake fluid of the secondary circuit is suctioned off from the secondary circuit.

8. The method according to claim 1, wherein the lone separating valve is opened or closed as a function of a current state of the motor vehicle.

9. The method according to claim 1, wherein the brake fluid removed from the secondary circuit is collected in a compensation tank and at a later point in time introduced again into the secondary circuit.

10. The method according to claim 1, wherein only the brake fluid level of the secondary circuit is reduced by the opening of the lone separating valve.

11. A brake system comprising:
a brake pedal that it adjustable in its zero position and a lone separating valve arranged in a secondary circuit of the brake system between a main brake cylinder and respective wheel brakes of the secondary circuit, wherein the lone separating valve is configured to become open as a function of control commands in order to reduce a volume of a brake fluid in the secondary circuit of the brake system, and wherein the lone separating valve is further configured to become closed again after the volume of the brake fluid of the secondary circuit has been reduced by a predetermined amount, and wherein the brake system comprises a tandem brake cylinder housing a primary piston in fluid communication with a primary circuit and a secondary piston in fluid communication with the secondary circuit and wherein only the brake fluid level of the secondary circuit is reduced by the opening of the lone separating valve.

12. The brake system according to claim 11, wherein the lone separating valve is provided with an interface for exercising control with a control device, and wherein the control device is configured to detect the control command for opening and closing the lone separating valve as a function of a predetermined zero position of the brake pedal and to transmit it via the interface to the lone separating valve.

13. The brake system according to claim 11, wherein the brake system includes at least one electric engine, wherein a recuperation-based brake operation is carried out, and wherein the predetermined zero position of the brake pedal is detected as a function of the deceleration output of the electric engine.

14. The brake system according to claim 11, wherein only the brake fluid level of the secondary circuit is reduced by the opening of the lone separating valve.

* * * * *